United States Patent [19]
Byers

[11] Patent Number: 5,387,337
[45] Date of Patent: Feb. 7, 1995

[54] SCREENING APPARATUS

[75] Inventor: Edward V. Byers, Kinoulton, Great Britain

[73] Assignee: Haigh Engineering Company Ltd., Herefordshire, United Kingdom

[21] Appl. No.: 39,220

[22] PCT Filed: Aug. 23, 1991

[86] PCT No.: PCT/GB91/01433

§ 371 Date: Apr. 14, 1993

§ 102(e) Date: Apr. 14, 1993

[87] PCT Pub. No.: WO92/03209

PCT Pub. Date: Mar. 5, 1992

[30] Foreign Application Priority Data

Aug. 25, 1990 [GB] United Kingdom ............... 9018733

[51] Int. Cl.[6] .................. B01D 33/333; B01D 35/16
[52] U.S. Cl. .......................... 210/159; 210/160; 210/396; 210/400; 210/401; 210/408; 210/526
[58] Field of Search ............... 210/160, 159, 400, 401, 210/408, 526, 396; 198/681; 209/271, 285

[56] References Cited

U.S. PATENT DOCUMENTS

| | | | |
|---|---|---|---|
| 3,706,378 | 12/1972 | Markwick | 210/400 |
| 4,107,040 | 8/1978 | Rudolph et al. | 210/159 |
| 4,214,989 | 7/1980 | Rudolph et al. | 210/159 |
| 4,472,273 | 9/1984 | Hagihara | 210/159 |
| 4,518,494 | 5/1985 | Jackson | 210/159 |
| 4,521,306 | 6/1985 | Day | 210/159 |
| 4,597,864 | 7/1986 | Wiesemann | 210/160 |

FOREIGN PATENT DOCUMENTS

| | | | |
|---|---|---|---|
| 2360717 | 4/1978 | France | 210/159 |
| 0676204 | 8/1979 | U.S.S.R. | 210/159 |
| 9002596 | 3/1990 | WIPO | 210/159 |

Primary Examiner—Virginia Manoharan
Attorney, Agent, or Firm—Vidas, Arrett & Steinkraus

[57] ABSTRACT

An apparatus for separating solids from liquids including an endless rotatably mounted band of collecting arms for collecting screened solid material, each of the collecting arms having a leading collecting face and two opposite sides adjacent the leading collecting face, and being mounted on support rods which are arranged in spaced relationship around the band, link pieces rigidly attached to the collecting arms for linking one support rod to the next, such that the link pieces form continuous chains around the band, and separate the collecting arms one from the other to form slots between the link pieces, said link pieces being rotatable on the support rods to which they are attached, and a rotatable set of discharging teeth arranged to cooperate with said movable band by entering the slots as the band rotates to move along the leading collecting faces of the collecting arms, thereby to remove collected material gathered at the slots and from said leading collecting faces of the collecting arms.

4 Claims, 2 Drawing Sheets

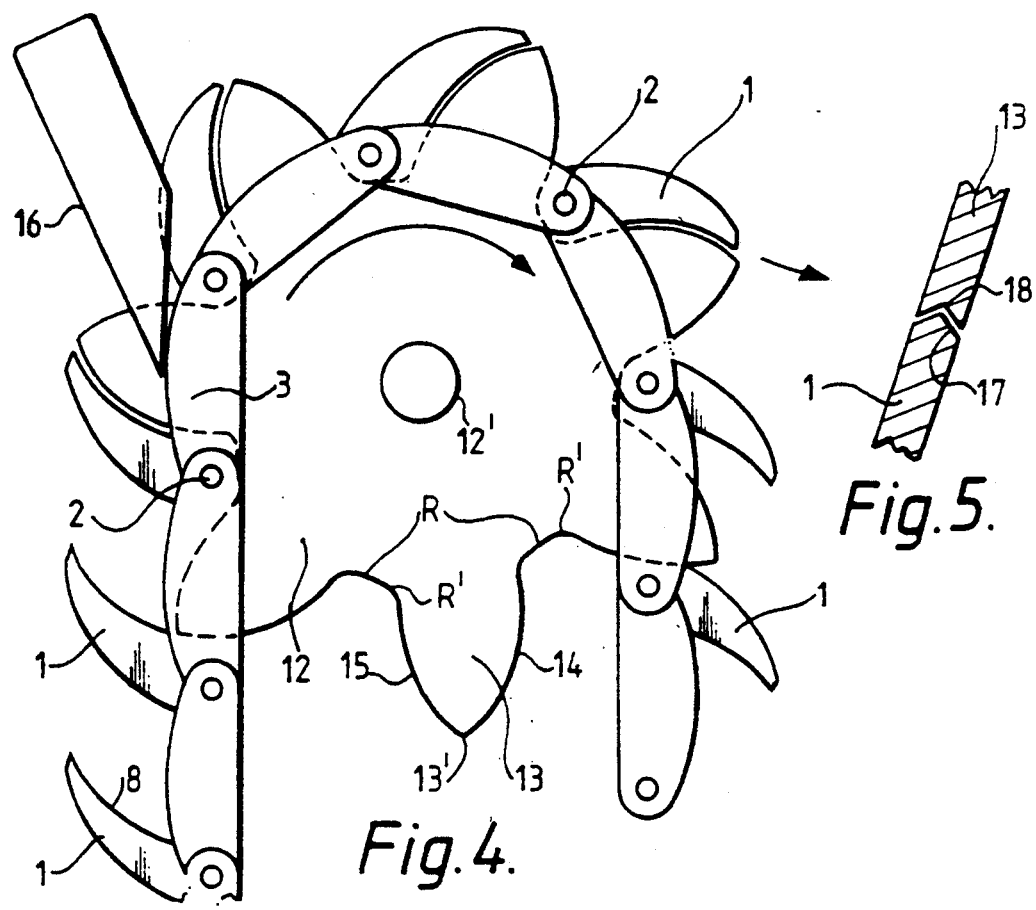
*Fig.4.*
*Fig.5.*
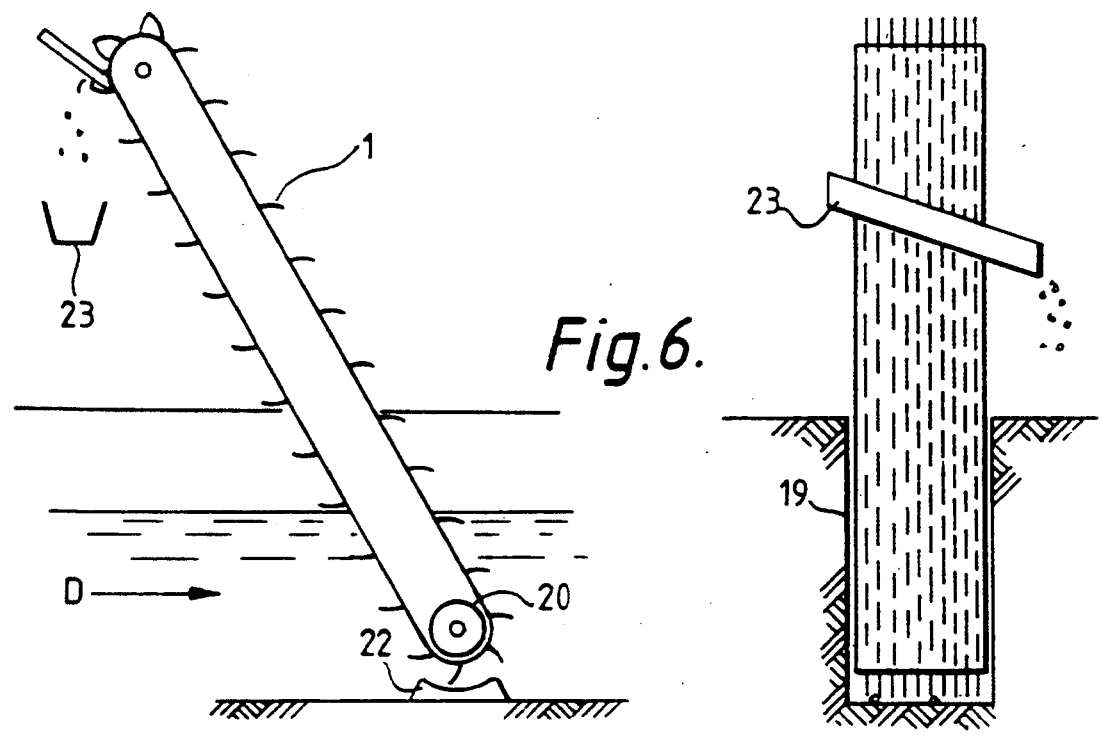
*Fig.6.*

SCREENING APPARATUS

FIELD OF THE INVENTION

The present invention relates to a screening device for use in the treatment of channelled water flows notably sewage, to remove detritus such as rags, string, plastic bags, condoms, and rubbish of other than a finely divided nature which might interfere with subsequent treatment processes.

BACKGROUND OF THE INVENTION

Difficulties are encountered in practice in the treatment of contaminated water flows such as sewage prior to fine filtration, due to the presence of heavy and generally untreatable objects such as rags, string, plastic bags, and the like.

If such items are not removed then proper and adequate treatment of the liquid does not result, and blockage of ducts and channels may occur.

A screening device is known comprising a continuously movable endless conveyor loop formed of a series of interconnected link pieces each having a lifting hook on which material to be screened is collected during movement through the contaminated water flow, and a rearwardly extending bar linkage.

The link pieces are mounted for rotatable movement on support rods extending across the width of the band conveyor loop such that as the link pieces are caused to rotate by means of a forced change in direction of travel of the loop, the books of the link pieces cooperate with the bar linkages of other link pieces, such that the bar linkages act to clear the hooks of collected material.

In addition a four armed rotating brush is used to clean the bar linkages of collected grease and similar unwanted deposits.

Whilst being effective, the prior art just described is complicated in design and costly to manufacture. It also requires the presence of two independently operable mechanical means to maintain the operating parts clean and free from contamination matter which builds up over time thereby reducing overall efficiency.

SUMMARY OF THE INVENTION

It is the object of the present invention to obviate the deficiencies of the prior art.

According to the present invention there is provided a device for separating solids from liquids comprising an endless rotatably mounted band of collecting arms for screened solid material, each of the collecting arms having a leading collecting face and two opposite sides adjacent the leading collecting face, and being mounted on support rods which are arranged in spaced relationship around the band, link pieces rigidly attached to the sides of collecting arms for linking one support rod to the next, such that the link pieces form continuous chains around the band, and separate the collecting arms one from the other to form slots between the link pieces, said link pieces being rotatable on the support rods to which they are attached, and a rotatable set of discharging teeth arranged to cooperate with said movable band by entering the slots as the band rotates to move along the leading collecting faces of the arms thereby to remove collected material gathered at the slots and from said leading collecting faces of the collecting arms.

Advantageously the discharging teeth are the teeth of a sprocket wheel which drives the movable band by means of said cooperation of the teeth thereof with said slots and the collecting arms.

To avoid clogging and to ensure maximum discharge of collected material at all times, scraper blades may be mounted between the continuous chains acting to dislodge matter accumulating on the flanks of the discharging teeth and the surfaces of the link pieces.

Preferably, the leading collecting face of each collecting arm lies on a circle, the center of which is the axis of rotation on the support rod to which the link piece of each collecting arm is attached.

The discharging teeth of the sprocket wheel preferably taper to an edge, which edge passes along and close to the surface of the leading collecting faces of the collecting arms along a respective row as the band revolves thereby removing collected solids therefrom.

The trailing flanks of the discharging teeth are preferably circular arcs described around the centers of the roots of the discharging teeth so that when in full engagement in the slots the trailing flanks of the discharging teeth correspond to and lie along the curved surfaces of the collecting arms.

BRIEF DESCRIPTION OF THE DRAWINGS

Other features and advantages of the present invention will become apparent from the following description of a preferred embodiment taken with reference to the accompanying drawings wherein;

FIG. 4 is a detailed side view of a continuous chain of linked collecting arms entrained around a sprocket wheel acting to drive the chain and remove collected material from the collecting arms;

FIG. 5 is a cross-sectional view of one embodiment of the cooperating surfaces of the discharging teeth and collecting arms of the screening device according to the invention; and FIG. 6 show side and front views of the screening device according to the invention, in operation.

BEST MODES OF CARRYING OUT THE PRESENT INVENTION

Figure 1:
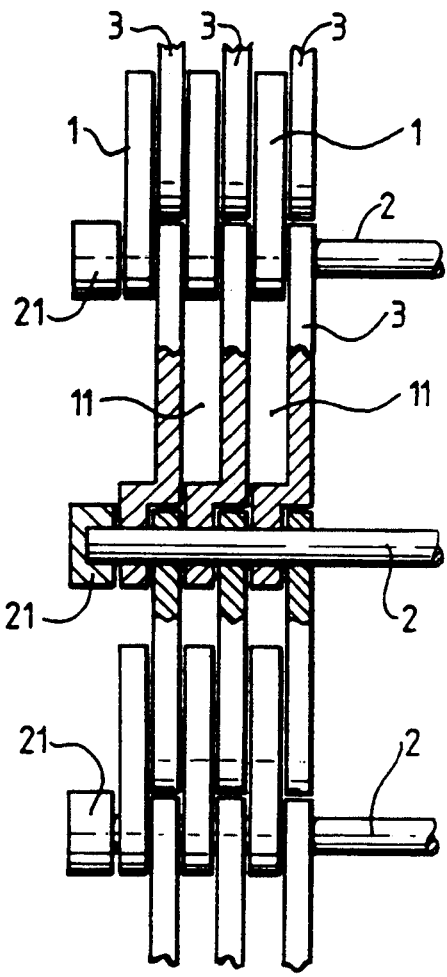
FIG. 1 shows a portion of the loop conveyor band of the screening device according to the invention in front view.
Figure 2:
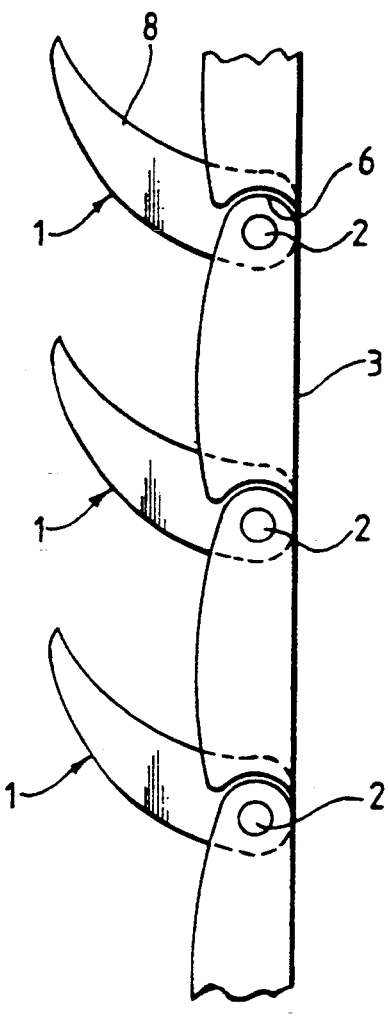
FIG. 2 is a side view in section through the loop conveyor band of the screening device shown in FIG. 1 showing a section of one continuous chain of linked collecting arms.

The screening device shown in the drawings see particularly FIG. 1, comprises a continuous conveyor band of movable collecting arms 1 for screened material arranged in parallel rows on support rods 2.

Figure 3:
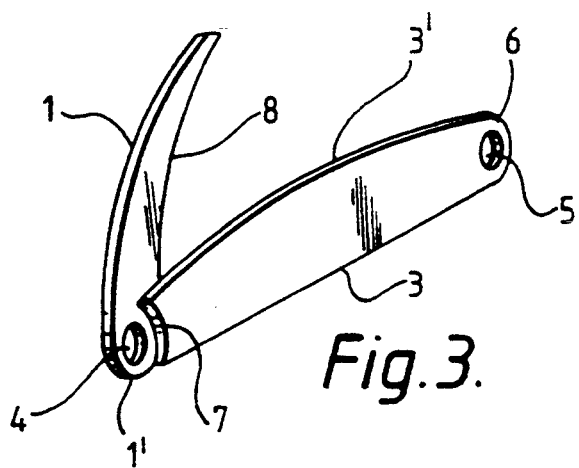
FIG. 3 is a perspective view of an integrally formed collecting arm and link piece used in the loop conveyor band shown in FIG. 2.

The collecting arms 1 in adjacent rows are connected together by link pieces 3 rigidly attached at one end to a side of each collecting arm 1 at the base thereof, see FIG. 3, to form endless chains of linked collecting arms 1 around the band.

The base of each collecting arm i is provided with a circular hole 4, see FIG. 3 for receiving the support rods 2, and the other end of the link pieces 3 a similar circular hole 5 for receiving a support rod 2 of the next row of collecting arms 1 to that row carrying the collecting arms 1 to which the link pieces 3 are attached.

The free end 6 of each link piece 3 is convex, see FIG. 3, and that end 7 attached to the sides of the collecting arms 1 correspondingly concave to permit rotational clearance as between the link pieces 3 along the continuous chains of linked collecting arms 1.

The leading collecting faces 8 of each collecting arm 1 lie on the arc of a circle the center of which is the axis of that support rod 2 to which the free ends of the link pieces 3 of the collecting arms 1 are rotatably attached.

As will be seen from FIG. 1, since the link pieces 3 are joined to the sides of the collecting arms 1, slots 11 are provided between the link pieces 3 along each representative row thereof when mounted on the support rods 2.

The conveyor band of collecting arms 1 is revolved by means of a row of sprocket wheels 12 mounted on a drivable shaft 12', the discharging teeth 13 of which sprocket wheels taper to an edge 13' and mesh with the slots 11 along a representative row of collecting arms 1 as illustrated in detail in FIG. 4.

The corner portion R' of the roots R of the discharging teeth 13 is arcuate in shape to engage the corresponding arcuate shapes of the ends 1' of the collecting arms, see FIG. 3, as the band is being driven by the sprocket wheels 12. The ends 1' of the collecting arms 1 are radially described around the axis of the holes 4.

The trailing flanks 14 of the discharging teeth 13 of each sprocket wheel 12 are circular arcs the radii of which correspond to the radii of the circular arcs describing the faces 8 of the collecting arms 1 so that as the sprocket wheels 12 rotate the collected material is swept away from leading collecting faces 8 of the collecting arms 1 by the discharging teeth 13 as the edges 13' and flanks 14 move along in close relationship leading collecting faces 8, and in the process clearing out material trapped against the sides of the slots 11 during the screening action.

The advancing flanks 15 of the discharging teeth 13 are preferably chamfered to facilitate entry into the slots 11 between the link pieces 3. Alternatively, the straight inwardly directed flanks of the link pieces 3 may be locally chamfered to facilitate such entry. They are also arcuately shaped to approximate the shape to the involute curve to a circle described about the rotational center of the sprocket wheels 12 and passing through the centers of the support rods 2 or near thereto so that stationary scrapers 16 arranged between the chains of linked collecting arms 1 may have a straight operational surface to cross the side or flank faces of the discharging teeth 13 at an angle of 90° or thereabouts to clear off any detritus without jamming in the manner as disclosed in the applicant's GB Patent 2190605B.

FIG. 4 illustrates how the outer profiles of the link pieces 3, combine to form a continuous circular surface on which the scrapers 16 may ride without oscillation, and in the process maintain the link pieces 3 free of any collected material.

The leading collecting surface 8 of each collecting arm 1 and the trailing flanks 14 of the discharging teeth 13 may have male and female matching profiles 17, 18 such as V-shapes as shown in FIG. 5. With this modification there is much less likelihood of material finding itself below the edges 15 of the discharging teeth 13 and causing an uncertain scraping action.

A screening device designed according to the invention is shown in operational use in FIG. 6 for screening a contaminated water flow contained in a channel 19.

The conveyor band is guided at its lower end around rotatably mounted wheels or arcuately shaped guides 20 which engage the end caps 21 attached to the end of the support rods 2, see FIG. 1.

An arcuately shaped stationary baffle plate 22 is positioned across the channel 19 and of sufficient length to be close to the collecting arms 1 over at least one pitch distance so that detritus is not able to pass under the transverse rows of collecting arms and avoid collection. Alternatively, in place of the baffle plate 22, a strip-brush knot shown) may be positioned across the invert of channel 19 such that the collecting arms i pass through the strip-brush, the bristles of which are long enough to bear onto the convex faces 3' of the link pieces 3.

The device is mounted so as to slope backwards against the direction D of influent flow so that detritus disengaged at the top of the conveyor band may drop vertically into a transversely mounted launder channel 23 without fouling the collecting arms 1.

The launder channel 23 may be sloped downwards towards one side of the device and continuously irregated with water or screened influent to urge collected detritus towards a collection skip (not shown) or other means of disposal such as apparatus for washing, dewatering and compacting screenings, prior to bagging and disposal.

I claim:

1. An apparatus for separating solids from liquids comprising: an endless rotatably mounted band of collecting arms (1) for collecting screened solid material, said rotatably mounted band of collecting arms (1) further comprising a plurality of collecting arms (1), each of the collecting arms (1) having a leading collecting face (8) and two opposite sides adjacent said leading collecting face (8) and being mounted on support rods (2) which are arranged in spaced relationship around the band; link pieces (3) rigidly attached to the collecting arms (1) for linking one support rod (2) to the next, such that the link pieces (3) form continuous chains around the band, and separate the collecting arms (1) one from the other to form slots (11) between the link pieces (3), said link pieces (3) being rotatable on the support rods (2) to which they are attached, wherein each leading collecting face (8) of each collecting arm lies on a circle, the center of which is the axis of rotation of a support rod (2) to which a link piece (3) of the collecting arm (1) is attached; and a plurality of sprocket wheels (12) having a set of discharging teeth (13), said discharging teeth (13) further including a trailing flank (14) and an advancing flank (15) which taper to an edge (13') which passes along and close to the surface of said leading collecting faces (8) of said collecting arms (1) along a respective row as the band revolves and being arranged to cooperate with and drive said movable band by entering the slots (11) as the band rotates to move along the leading collecting faces (8) of the collecting arms (1), thereby to remove collected material gathered at the slots (11) and from said leading collecting faces (8) of the collecting arms (1).

2. An apparatus as claimed in claim 1 wherein the trailing flanks (14) of said discharging teeth (13) are circular arcs the radii of which correspond to the radii of curvature of the leading collecting faces (8) of the collecting arms (1) so that when in full engagement in said slots (11) said trailing flanks (14) correspond to and lie along said leading collecting faces (8) of said collecting arms (1).

3. An apparatus as claimed in claim 2 wherein the leading collecting surface (8) of each collecting arm (1) and said trailing flanks (14) of the discharging teeth (13) have matching profiles (17,18), which register as the trailing flanks (14) move along the leading collecting surfaces (8) of the collecting arms (1).

4. An apparatus as claimed in claim 2 wherein the link pieces (3) have inwardly and outwardly facing edge surfaces (3, 3') with respect to the endless band of which they form a part, the outwardly facing edge surfaces (3') being arcuate so that they combine to form a continuously curved surface when moving around the sprocket wheel (12), a scraper blade (16) being mounted between adjacent ones of said continuous chains to engage said arcuate surfaces (3') of the link pieces (3) in each chain thereby to remove collected matter accumulated thereon and from the trailing flanks (14) and advancing flanks (15) of the discharging teeth (13) entering the slots (11).

* * * * *